June 28, 1960  R. A. TAYLOR  2,942,393
MATERIAL HANDLING PLANT
Filed March 28, 1957  3 Sheets-Sheet 1
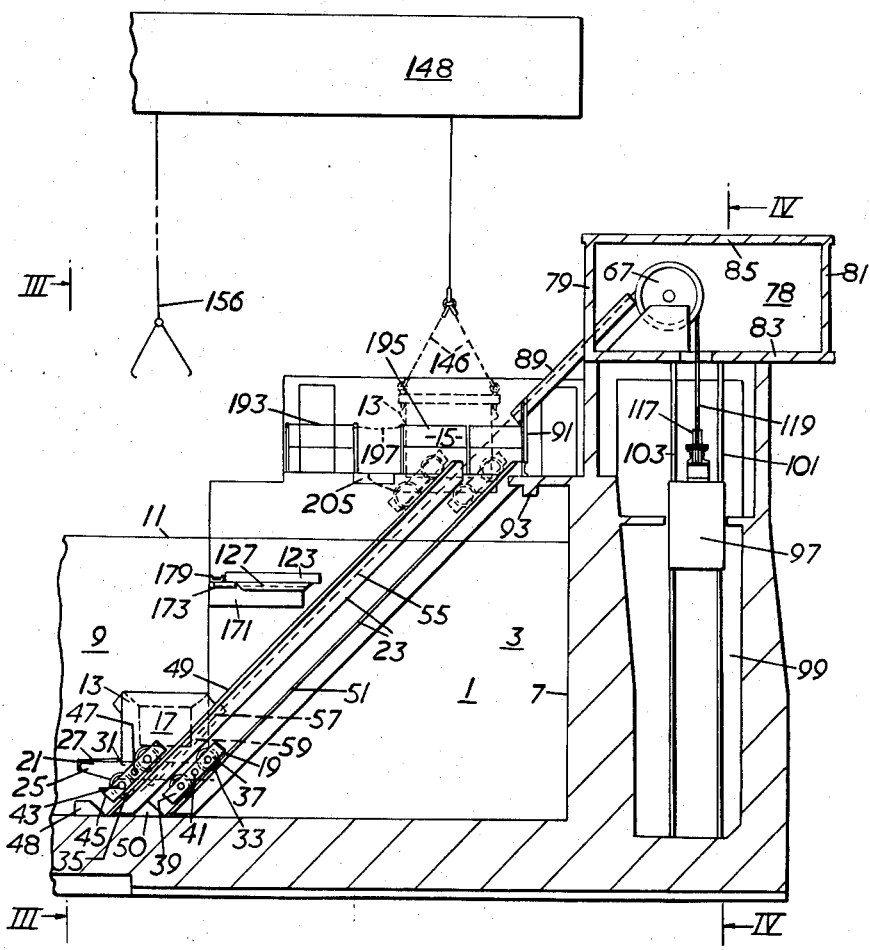

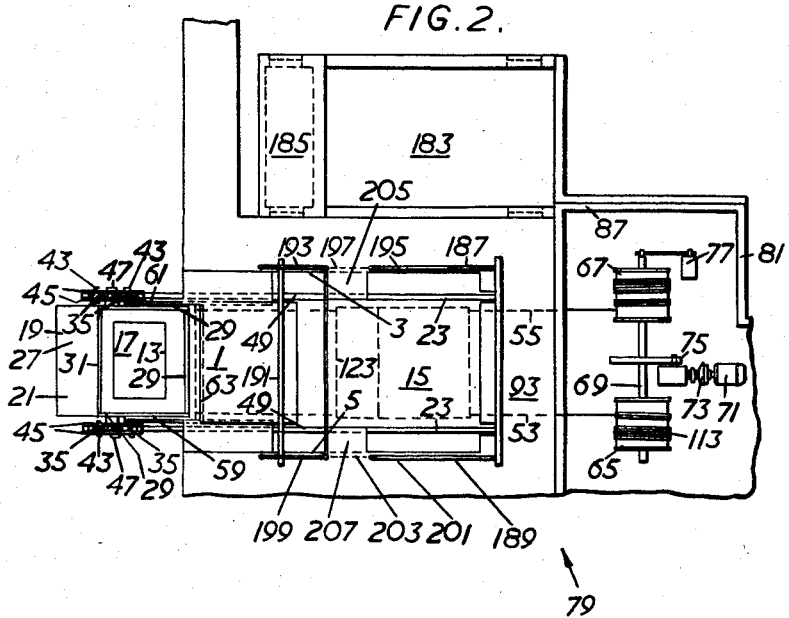
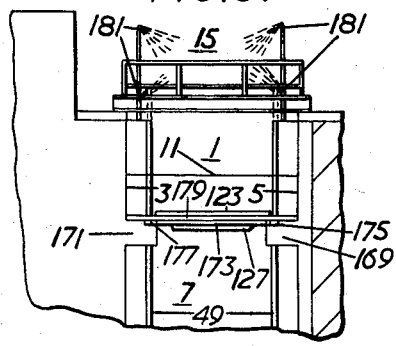

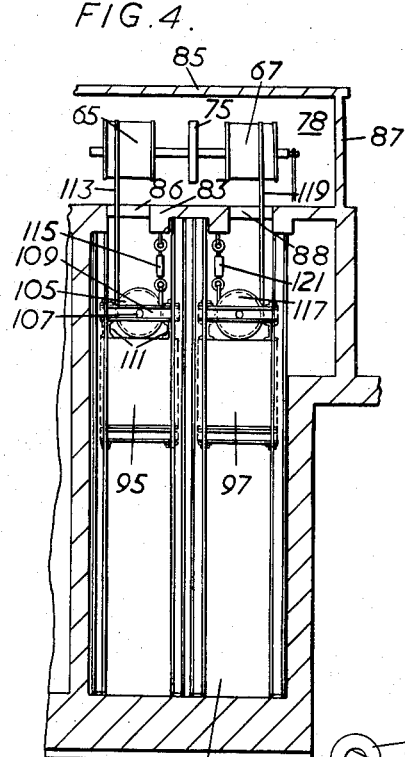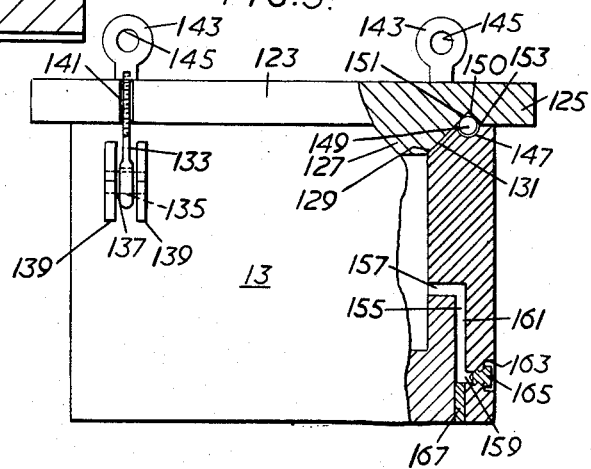

United States Patent Office 2,942,393
Patented June 28, 1960

2,942,393
MATERIAL HANDLING PLANT

Richard A. Taylor, London, England, assignor to Babcock & Wilcox Limited, London, England, a British company Filed Mar. 28, 1957, Ser. No. 649,218

Claims priority, application Great Britain Mar. 28, 1956

12 Claims. (Cl. 53—249)

This invention relates to material handling plant and particularly to plant for handling radioactive nuclear reactor fuel elements. Customarily, when spent fuel elements are withdrawn from the nuclear reactor they are stored for a period in a pond during which time their radioactivity diminishes to an extent sufficient to enable the elements safely to be transported in enclosing coffins. While the elements are in the pond, the water of the pond serves as a biological shield, but even after the required period of immersion the fuel elements are still sufficiently radioactive to constitute, unless immersed in the pond or enclosed in coffins, a grave danger to operating personnel. It is an object of the present invention to effect removal of fuel elements from the pond and the loading of coffins in a manner such that the safety of the operating staff is ensured.

Further objects and advantages of the invention will be apparent from the ensuing description of an embodiment of the invention.

The invention will now be described, by way of example, with reference to the accompanying partly diagrammatic drawings, in which:

Figure 1 is a sectional side elevation of plant for handling radioactive nuclear reactor fuel elements;

Figure 2 is a plan view of Figure 1;

Figures 3 and 4 are respectively a fragmentary view taken on the line III—III of Figure 1 and a sectional view taken on the line IV—IV of Figure 1; and Figure 5 is a view, partly in section and to a scale larger than that of the remaining figures, of a fuel element coffin within which used fuel elements are transported.

Referring to the drawings, plant for handling used nuclear reactor fuel elements is disposed in a shaft 1 formed by side walls 3 and 5 and rear wall 7 at one end of a reservoir or pond 9, the water level within which is indicated by the line 11, where spent fuel elements withdrawn from a nuclear reactor associated with the plant are stored for a period during which their radioactivity diminishes to an extent sufficient to permit the elements safely to be transported to a processing plant. The plant includes transporting means for moving a fuel element coffin 13 between a first station above the liquid level 11 in the reservoir and generally indicated by the reference 15 and a second station within the pond indicated by the reference 17 (see Figure 1). The transporting means are in the form of a skip hoist 19 having a carriage 21 which is arranged to run on an inclined track 23 extending between the upper station 15 and the lower station 17.

The carriage 21 of the skip hoist 19 is formed by a rectangular frame 25 the forward end of which is covered by a plate or platform 27. Sides of the frame 25 rearwardly of the platform 27 are formed with upstanding flanges 29 which together with the rear edge 31 of the platform 27 serve as locating means for ensuring proper positioning of the coffin 13 in relation to the carriage. At each side of the carriage 25 there are provided a pair of flanged wheels 33 and a pair of flanged wheels 35.

The wheels 33 are mounted on axles 37 secured on opposite sides of the wheels 33 to parallel plates 39 pivotally mounted by means of a trunnion 41 on the frame 25. Similarly, the wheels 35 are mounted on axles 43 which are secured on opposite sides of the wheels 35 to parallel plates 45 pivotally mounted by a trunnion 47 on the frame 25.

The track 23 comprises two pairs of horizontally spaced rails supported upon appropriate structural work (not shown) which are disposed with respect to the bottom of the pond 9 at an inclination of 45°. Thus, the pairs of wheels 35 are arranged to run on rails 49, whilst the wheels 33 are arranged to run on rails 51 respectively disposed in the plane of and somewhat below the rails 49. Stops 48 and 50 are provided respectively at the bottoms of the rails 49 and 51 and serve, in the event of over-running of the carriage 21, to prevent damage thereto.

The skip hoist 19 is operated by cables 53 and 55 connected to a bridle 57 mounted on the carriage 21. The bridle consists of side pieces 59 and 61 pivotally connected at their lower ends to the frame 25 and connected at their upper ends by a transom 63. The cables 53 and 55 are connected to and extend from the transom 63 upwardly to and around respective pulleys 65 and 67 to which they are secured and which are mounted on a common shaft 69.

For driving the pulleys 65 and 67 there is provided an electric motor 71 (see Figure 2) coupled to the shaft 69 through fluid coupling 73 and suitable reduction gear 75. Rotation of the shaft 69 is arranged to effect operation of limit switches provided in a housing 77 which serve to cut out the motor 71 at the limits of travel of the carriage 21.

The pulleys 65 and 67 and the drive therefor are accommodated in a chamber 78 having a front wall 79 through which the cables 53 and 55 pass, rear wall 81, floor 83, roof 85 and side walls such as the side wall 87. The cables 53 and 55 are arranged to pass through steel tubes such as the tube 89 associated with the cable 55 which serve to receive and return to the pond 9 any water which may drip from the cables in the course of operation. The tube 89 is supported at its forward end by structural work 91 mounted on a forwardly projecting ledge 93 at the rear of the shaft 1 and towards its rear end in the wall 79, whilst the tube associated with the cable 53 is similarly supported at its forward end by structural work mounted on the ledge 93 and towards its rear end in the wall 79.

So as to reduce the couple acting on the pulleys 65 and 67 and, therefore, the power required of the motor 71 to lift the carriage 21 and coffin 13, the pulleys 65 and 67 have respectively associated therewith counterweights 95 and 97 disposed in a vertically extending shaft 99 provided below the floor 83 of the chamber 78 and of which the weight 97 is mounted for vertical travel on guide rails 101 and 103, whilst similar guide rails (not shown) are provided upon which the weight 95 is mounted for vertical travel in the shaft 99.

The vertical travel of the weights 95 and 97 is arranged to be equal to half the extent of travel of the carriage 21. To this end there is provided upon the weight 95 a pulley 105 having a spindle 107 supported in channels 109 which, in turn, are supported on channels 111 fixed to the top of the counterweight 95. A rope 113 clipped at one end to the pulley 65 extends around that pulley and downwardly through an aperture 86 in the floor 83 of the chamber 78 to and around the pulley 105 to a shackle 115 which is anchored to the underside of the floor 83 of the chamber 78. The weight 97 is similarly provided with a pulley 117 mounted thereon after the manner of the pulley 105 on the weight 95 and a rope 119 clipped at one end to the pulley 67 extends around that pulley and downwardly through an aperture 88 in the floor 83 of the chamber 78 to and around the pulley 117 and thence to a shackle 121 which is anchored to the underside of the floor 83.

As shown in Figure 5, the coffin 13 is a thick walled vessel of rectangular cross-section having a lid 123 with a flange 125 projecting on all sides of the coffin. The lid 123 is formed with an inwardly extending projection 127 having bevelled sides 129 inclined at 45° to the top of the lid 123 and arranged to engage complementary bevelled surfaces 131 formed on the side walls of the coffin. For securing the lid 123 in position on the coffin four bolts such as the bolt 133 are provided near the corners of the coffin. Bolts 133 are each formed with an eye 135 by means of which the bolt is mounted on a hinge pin 137 supported in lugs 139 provided on the body of the coffin. The lid 123 is formed with vertically extending grooves such as the groove 141 within which, when the lid 123 is secured to the coffin, the associated bolt 133 extends so as to project above the top of the coffin. With the lid secured to the coffin, the tops of the bolts 133 are engaged by nuts 143 respectively provided with eyes 145 to enable the attachment thereto of slings 146 of a crane 148.

Between the bevelled surfaces 131 and the outer sides of the coffin, the upper surfaces of the walls of the coffin are formed with a groove 147 which is semi-circular in cross-section and within which is disposed a sealing ring 149 which is circular in cross-section and consists of rubber or the like resilient material. For accommodating the ring 149 in the lid 123 of the coffin there is provided a V-shaped groove 150 one side of which is formed by a surface 151 constituting an extension of a bevelled surface 129 on the projection 127 of the lid, whilst another side 153 of the groove 150 extends in a direction normal or substantially normal to the surface 151. In a side wall of the coffin 13 there is formed a stepped hole 155 comprising a horizontal bore 157 extending outwardly from the inner surface of the side wall, a horizontal bore 159 extending inwardly from the outer surface of the side wall, and a vertical bore 161 uniting the bores 157 and 159. An outermost section 163 of the bore 159 has a diameter larger than that of the remaining part of the bore 159 and a part of the bore extending inwardly from the section 163 is internally threaded and engaged by a stopper 165. Before lowering of the coffin 13 into the pond 9 the stopper 165 is removed so that upon removal of the coffin from the pond the water level within the coffin will fall to the level predetermined by the level of the bore 157. The hole 155 is formed by drilling bores 157 and 159 from opposite sides of the side wall of the coffin and then connecting the bores 157 and 159 by drilling the bore 161 from the bottom of the coffin. The length of the bore 161 between the bore 159 and the bottom of the coffin is then suitably plugged by a metal plug 167. The stepped construction of the hole 155 ensures the provision of adequate metallic shielding for radioactive contents of the coffin 13.

For providing adequate shielding of an operator engaged in the neighborhood of the plant the lid of the coffin 13 is arranged to be on the coffin when the coffin is at any location below a predetermined location beneath the level 11 of water in the pond 9, whilst to permit loading of the coffin with a basket of spent fuel elements means are provided for removing the lid of the coffin prior to the arrival of the coffin at the station 17. For this purpose at a level somewhat below the water level 11 in the pond 9 the side walls 3 and 5 of the shaft 1 are respectively formed with coffin lid supporting means in the form of inwardly extending horizontal projections 169 and 171 which extend rearwardly from the forward end of the shaft 1 and are arranged upon lowering of the coffin to engage the flange 125 of the lid 123 at opposite sides of the coffin. At the forward ends of the projections 169 and 171 flush with the upper surfaces thereof there are provided further supporting means for the lid 123 in the form of a beam 173 which extend between and is supported by the projections 169 and 171 and which, upon lowering of the coffins is arranged to engage the flange 125 at the forward end of the lid 123 of the coffin. The projections 169 and 171 are provided with steel plates 175 and 177 so as to prevent wear on those surfaces of the projections which engage the lid 123 of the coffin and upon the beam 173 is provided a channel 179 which acts as a stop which, when the coffin lid 123 is engaged by the projections 169 and 171 and the beam 173, prevents forward movement of the lid.

It will be appreciated that as the coffin 13 mounted on the carriage 21 of the skip hoist is lowered into the pond the lid 123 of the coffin is intercepted by the projections 169, 171 and the beam 173 and since the side 153 of the groove 150 in the part of the lid nearest the track 23 is disposed at right angles to the direction of movement whilst the side 151 of the groove 150 in the part of the lid nearest the track and the surfaces 129 and 131 adjacent to that groove are disposed parallel to the direction of movement of the coffin 13, no damage to the sealing ring 149 can take place as the body of the coffin continues in its downward path to the station 17. By virtue of the horizontal component of motion of the coffin, the body of the coffin is laterally displaced with respect to the lid 123 after interception of the lid so that upon arrival at the station 17 access to the top of the coffin is unobstructed and a separate crab or separate crabs of the crane may be employed without difficulty to lift a basket of spent fuel elements into the body of the coffin.

At the station 15, near the position occupied by the coffin 13, there are provided water jets 181 which are used, when the coffin is removed from the pond 9, to wash the coffin so as to remove contaminated water which may adhere to the sides thereof.

Alongside the shaft 1 a cleansing area 183 is provided within which coffins removed from the station 15 are washed with water and suitable detergents prior to mounting of the coffins on vehicles which convey the coffins to a spent fuel element processing plant. The floor of the area 183 is suitably sloped and a drain (not shown) is provided so that water collected in the area 183 may be discharged to the pond 9. At one side of the area 183 there is a control room 185 within which is provided operating gear for the crane and for the motor 71 and from which the supply of water to the jets 181 is controlled.

To prevent personnel falling into the shaft 1 suitable hand-rails 187, 189 and 191 are provided of which the hand-rail 187 includes a forward section 193 and a rearward section 195 connected by a removable chain 197 whilst the rail 189 includes a forward section 199 and a rearward section 201 connected by a removable chain 203 and the rail 191 extends between the rear ends of the rail sections 193 and 199. At the sides of the shaft 1 between the hand-rail sections 193 and 195 and the hand-rail sections 199 and 201 are provided respective inwardly extending reinforced concrete ledges 205 and 207 so that when the carraige 21 of the skip hoist 19 is disposed at the station 15 and after cleansing of the coffin with the water jets 181 an operator, suitably clad in protective clothing, can walk from the control room 185 by way of the ledge 205 onto the platform 27 so as to bolt down the lid 123 of the coffin with the bolts 133 and nuts 143. If desired, the operator can then walk by way of the ledge 207 to the other side of the shaft 1.

In operation, an operator in the control room 185 starts the motor 71 to bring the carriage 21 of the skip hoist 19 to the station 15. The crane is then operated to lower a coffin onto the carriage 21 after which the operator crosses to the platform 27 and unfastens the slings of the crane after which the nuts 143 are removed from the lid 123 of the coffin and the bolts 133 are lowered to the sides of the coffin. The plug 165 is removed from the bore 159 and the operator then returns to the control room 185 and lowers the coffin to the station 17 in the course of which movement the lid 123 is intercepted by projections 169 and 171 and the beam 173. With the coffin at the station 17 the operator employs a separate crab 156 of the crane so as to lift a basket of used fuel elements into the coffin 13 after which the motor 71 is operated so as to raise the skip hoist 19 to the station 15 during which movement the lid 123 is replaced on the coffin. As the coffin is raised above the water level 11 in the pond 9, water within the coffin drains through the hole 155 to the level predetermined by the position of the bore 157. Upon arrival at the station 15, the coffin is washed with water supplied by way of the jets 181, after which the operator returns to the coffin, secures the lid 123 by fastening the nuts 143 to the bolts 133, connects the slings of the crane with the nuts 143 and replaces the stopper 165. The operator then goes back to the control room 185 and operates the crane so as to remove the coffin from the station 15 to the cleansing area 183 where the coffin is scrubbed with water and appropriate detergents. The crane is then operated so as to transfer the coffin from the cleansing area 183 to a vehicle for conveyance to a used fuel element processing plant.

Advantageously, the fuel elements in the pond are disposed in regularly oriented manner within baskets which may be lifted from their positions, moved laterally and lowered into the coffins at the second station 17.

It will be appreciated that as an alternative to removing the lid of the coffin below the water level 11 a concrete or the like biological shield could be provided in order to ensure safety of personnel before replacement of the coffin lid at a location above the water level in the pond 9.

If desired, plant similar to that described could be utilised for accepting loaded coffins, lowering loaded coffins from the first station 15 to the second station 17 in the pond and removing baskets of fuel elements from the coffins to storage positions in the pond.

What I claim is:

1. Plant for handling radioactive nuclear reactor fuel elements comprising a fuel element coffin including a coffin lid, transporting means for moving the fuel element coffin between a first station above the liquid level in a pond, at which the coffin is required to be lidded and a second station within the pond at which the coffin is required to be open and which is disposed below and laterally with respect to the first station, and coffin lid supporting means adapted to intercept the coffin lid in its descent with the coffin and to support the lid at a position which is intermediate the first and second stations and with respect to which the coffin is moved laterally in its movement to the second station so that at the second station the movement of fuel elements in relation to the coffin is unobstructed by the lid.

2. Plant as claimed in claim 1, wherein the coffin lid supporting means are arranged below the surface level of the pond.

3. Plant as claimed in claim 1, wherein spraying means are provided for washing the coffin before it is removed from the first station.

4. Plant as claimed in claim 3, wherein a cleansing area for the reception of the coffin after washing thereof is disposed adjacent the first station.

5. Plant as claimed in claim 4, wherein means are provided for collecting liquid employed in the cleansing area and for conveying the liquid to the pond.

6. Plant as claimed in claim 1, wherein the transporting means include a skip hoist comprising an inclined track extending between the first station and the second station, a carriage arranged for travel along the track and adapted for carrying the fuel element coffin, and means for hoisting and lowering the carriage along the track.

7. Plant as claimed in claim 1, wherein means are provided for lowering the liquid in the coffin to a predetermined level upon removal of the coffin from the pond.

8. Plant for handling radio-reactive nuclear reactor fuel elements, comprising a nuclear reactor fuel element coffin including a lid, transporting means for moving the coffin between a first station above the liquid level in a pond at which the coffin is required to be lidded, and a second station in the pond at which the coffin is required to be open and which is disposed below and laterally with respect to the first station, said transporting means including a skip hoist comprising an inclined track extending between the first station and the second station, a carriage arranged for travel along the track and adapted for carrying the fuel element coffin, and means for hoisting and lowering the carriage along the track, and coffin lid supporting means adapted to intercept the coffin lid in its descent with the coffin and to support the lid at a position which is intermediate to the first and second stations and with respect to which the coffin is moved laterally in its movement to the second station so that at the second station the movement of fuel elements in relation to the coffin is unobstructed by the lid, the lid for the coffin having a part extending inwardly with respect to the top of the coffin, the edge of said part of the coffin lid and a complementary surface of the coffin being bevelled at such angle that with the coffin upright on the skip hoist carriage the track and the edge of the said parts at a location nearest the track are approximately parallel.

9. Plant as claimed in claim 8, wherein a sealing ring is provided for making a tight joint between the coffin and its lid and pivoted bolts fitted with nuts are provided for clamping the lid in position.

10. Plant as claimed in claim 9, wherein a V-shaped groove adapted to engage the sealing ring is formed in the lid of the coffin, the sides of the grooves extending respectively in or substantially in the direction of motion of the coffin between the first and second stations and normal or substantially normal to the said direction.

11. Plant as claimed in claim 8, wherein means are provided for lowering the liquid in the coffin to a predetermined level upon removal of the coffin from the pond.

12. Plant as claimed in claim 11, wherein a side wall of the coffin is formed with a hole for the passage through the side wall of liquid, the hole occupying an extended path through the side wall and being provided with a stopper for closing the hole from the exterior of the coffin.

References Cited in the file of this patent

UNITED STATES PATENTS

| | | |
|---|---|---|
| 2,689,677 | Unger | Sept. 21, 1954 |
| 2,701,659 | Baltosser | Feb. 8, 1955 |
| 2,721,018 | Heavin | Oct. 18, 1955 |
| 2,770,591 | Wigner et al. | Nov. 13, 1956 |
| 2,832,502 | Baker | Apr. 29, 1958 |